United States Patent
Park (10) Patent No.: US 9,803,504 B2
(45) Date of Patent: Oct. 31, 2017

(54) STEAM TURBINE (71) Applicant: DOOSAN HEAVY INDUSTRIES CONSTRUCTION CO., LTD., Gyeongsangnam-do (KR)

(72) Inventor: Luke Park, Gyeonggi-do (KR)

(73) Assignee: DOOSAN HEAVY INDUSTRIES & CONSTRUCTION CO., LTD., Gyeongsangnam-do (KR)

(*) Notice: Subject to any disclaimer, the term of this patent is extended or adjusted under 35 U.S.C. 154(b) by 51 days.

(21) Appl. No.: 15/080,333

(22) Filed: Mar. 24, 2016

(65) Prior Publication Data
US 2017/0058702 A1 Mar. 2, 2017

(30) Foreign Application Priority Data
Aug. 24, 2015 (KR) .......................... 10-2015-0119033

(51) Int. Cl.
*F01K 13/02* (2006.01)
*F01K 3/24* (2006.01)
(Continued)

(52) U.S. Cl.
CPC ............ *F01K 13/02* (2013.01); *F01D 17/145* (2013.01); *F01K 3/24* (2013.01); *F01K 7/165* (2013.01); *H02K 7/1823* (2013.01)

(58) Field of Classification Search
CPC . F01K 3/24; F01K 7/165; F01K 13/02; F01D 17/145; H02K 7/1823
See application file for complete search history.

(56) References Cited

U.S. PATENT DOCUMENTS 4,744,723 A * 5/1988 Hashimoto ............... F01K 7/24
415/1
6,220,014 B1 4/2001 Wada et al.
(Continued)

FOREIGN PATENT DOCUMENTS

EP 0939200 A1 9/1999
JP 2002070506 A 3/2002
(Continued)

OTHER PUBLICATIONS

An extended European search report dated Mar. 9, 2017 by European Patent Office in connection with European Patent Application No. 16165770.5.

*Primary Examiner* — Audrey K Bradley
(74) *Attorney, Agent, or Firm* — Baker & McKenzie LLP (57) ABSTRACT

A steam turbine includes a boiler unit, first supply pipes, a second supply pipe, a plurality of valve units, a drain valve unit, and a controller. The controller is configured to control, before rotation of the turbine starts, an operation time and temperature of the auxiliary boiler so that the temperatures of the high-pressure turbine and the intermediate-pressure turbine are increased to the first setting temperature. The controller is configured to control, when the temperatures of the high-pressure turbine and the intermediate-pressure turbine are maintained at the first setting temperature, operation of the main boiler such that the temperature of the intermediate-pressure turbine reaches a second setting temperature while operation of the auxiliary boiler is interrupted, and control, when the temperature of the intermediate-pressure turbine is maintained at the second setting temperature, the operation of the main boiler such that steam is supplied only to the high-pressure turbine.

12 Claims, 7 Drawing Sheets

(51) Int. Cl.
*F01K 7/16* (2006.01)
*F01D 17/14* (2006.01)
*H02K 7/18* (2006.01)

(56) References Cited

U.S. PATENT DOCUMENTS

2010/0281877 A1    11/2010   Asanaka et al.
2014/0165565 A1*   6/2014   Shindo ..................... F01K 9/04
                                                                                  60/646

FOREIGN PATENT DOCUMENTS

JP          2004-278338 A     7/2004
JP          2004278338 A     10/2004

* cited by examiner

STEAM TURBINE

CROSS-REFERENCE TO RELATED APPLICATION(S)

This application claims priority to Korean Patent Application No. 10-2015-0119033 filed on Aug. 24, 2015 the disclosure of which is incorporated herein by reference in its entirety.

BACKGROUND

Exemplary embodiments of the present disclosure relate to reducing a start-up time of a steam turbine, and more particularly, to a steam turbine capable of being operated with the temperature of a rotor of an intermediate-pressure turbine increased as high as possible before rotation of the steam turbine starts in a state in which thermal stress of the intermediate-pressure turbine is minimized.

Generally, with regard to start-up of a steam turbine, if the time it takes to restart the steam turbine that is in an interrupted state is increased, a large difference between the temperature of a turbine rotor and the temperature of supplied steam may be caused. Due to this, the rotor provided in an intermediate-pressure turbine may be deformed or damaged by thermal stress in an initial operation. Therefore, particular attention to this is required.

As start-up and restart of the turbine are repeated many times, the lifetime of the turbine rotor is reduced. In this regard, various methods of pre-warming the steam turbine, prior to the operation thereof, to solve problems caused by thermal stress of the rotor have been proposed.

For example, a conventional steam turbine uses a method of performing pre-warming in such a way that steam is supplied into a high-pressure casing and the interior of the high-pressure casing is retained for several hours at an allowed maximum pressure.

The pre-warming operation of such a conventional method has been mainly used as a method for preheating the rotor because it has advantages in that both a rotating part and a stationary part can be preheated before start-up and the rotating part and the stationary part can be prevented from coming into contact with each other due to abnormal deformation of the turbine rotor or the casing.

BRIEF SUMMARY

In an embodiment, a steam turbine includes a boiler unit, first supply pipes, a second supply pipe, a plurality of valve units, a drain valve unit, and a controller. The boiler unit includes an auxiliary boiler and a main boiler that supply steam to a high-pressure turbine and an intermediate-pressure turbine. The first supply pipes diverge from the auxiliary boiler and respectively extending to the high-pressure turbine and the intermediate-pressure turbine. The second supply pipe is coupled with the high-pressure turbine, the intermediate-pressure turbine, and a condenser so that steam supplied through the first supply pipes is transferred to the condenser via the high-pressure turbine and the intermediate-pressure turbine. The plurality of valve units respectively disposed on each of the first supply pipes and are configured to be operated when the auxiliary boiler is operated. The drain valve unit is disposed on the second supply pipe and configured to discharge condensate water that has passed through the high-pressure turbine and the intermediate-pressure turbine. The controller is configured to control an opening amount of each of the valve units and the drain valve unit and to control an operation state of the boiler unit based on a first setting temperature to which temperatures of the high-pressure turbine and the intermediate-pressure turbine are preset. The controller is configured to control, before rotation of the turbine starts, an operation time and temperature of the auxiliary boiler so that the temperatures of the high-pressure turbine and the intermediate-pressure turbine are increased to the first setting temperature. The controller is configured to control, when the temperatures of the high-pressure turbine and the intermediate-pressure turbine are maintained at the first setting temperature, operation of the main boiler such that the temperature of the intermediate-pressure turbine reaches a second setting temperature while operation of the auxiliary boiler is interrupted, and control, when the temperature of the intermediate-pressure turbine is maintained at the second setting temperature, the operation of the main boiler such that steam is supplied only to the high-pressure turbine.

In another embodiment, a method of preheating a steam turbine includes supplying, simultaneously and before rotation of the turbine starts, steam to a high-pressure turbine and an intermediate-pressure turbine provided in the turbine; operating, after the rotation of the turbine starts, the high-pressure turbine, the intermediate-pressure turbine and a low-pressure turbine when temperatures of the high-pressure turbine and the intermediate-pressure turbine are maintained at a predetermined first setting temperature; supplying steam only to the intermediate-pressure turbine after the temperature of the intermediate-pressure turbine reaches the first setting temperature; and interrupting, when it is determined that the temperature of the intermediate-pressure turbine is maintained at a second setting temperature, the supply of steam to the intermediate-pressure turbine, and supplying steam only to the high-pressure turbine.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

An object of the present disclosure is to provide a steam turbine which is configured to be pre-warmed using an auxiliary boiler and a main boiler so that a start-up time of the turbine can be reduced, whereby deformation of a rotor due to thermal stress can be reduced or minimized.

Other objects and advantages of the present disclosure can be understood by the following description, and become apparent with reference to the embodiments of the present disclosure. Also, it is obvious to those skilled in the art to which the present disclosure pertains that the objects and advantages of the present disclosure can be realized by the means as claimed and combinations thereof.

In accordance with one aspect of the present disclosure, a steam turbine including: a boiler unit including an auxiliary boiler and a main boiler that are provided to supply steam to a high-pressure turbine and an intermediate-pressure turbine; first supply pipes diverging from the auxiliary boiler and respectively extending to the high-pressure turbine and the intermediate-pressure turbine; a second supply pipe coupled among the high-pressure turbine, the intermediate-pressure turbine, and a condenser so that steam supplied through the first supply pipe is transferred to the condenser via the high-pressure turbine and the intermediate-pressure turbine; a valve unit installed on each of the first supply pipes and configured to be operated when the auxiliary boiler is operated; a drain valve unit installed on the second supply pipe and configured to discharge condensate water that has passed through the high-pressure turbine and the intermediate-pressure turbine; and a controller configured to control opening degrees of the valve unit and the drain valve unit and an operation state of the boiler unit depending on a first setting temperature to which temperatures of the high-pressure turbine and the intermediate-pressure turbine are preset. The controller controls, before rotation of the turbine starts, operation time and temperature of the auxiliary boiler so that the temperatures of the high-pressure turbine and the intermediate-pressure turbine are increased to the first setting temperature. The controller controls, when the temperatures of the high-pressure turbine and the intermediate-pressure turbine are maintained at the first setting temperature, operation of the main boiler such that the temperature of the intermediate-pressure turbine reaches a second setting temperature while operation of the auxiliary boiler is interrupted, and controls, when the temperature of the intermediate-pressure turbine is maintained at the second setting temperature, the operation of the main boiler such that steam is supplied only to the high-pressure turbine.

In accordance with another aspect of the present disclosure, the steam turbine may further include: a first temperature sensor configured to sense the temperature of the high-pressure turbine; and a second temperature sensor configured to sense the temperature of the intermediate-pressure turbine.

In the steam turbine in accordance with another aspect of the present disclosure, the controller may receive temperature data sensed by the first temperature sensor and the second temperature sensor and determine the temperatures of the high-pressure turbine and the intermediate-pressure turbine.

In the steam turbine in accordance with another aspect of the present disclosure, the controller may control, when controlling the auxiliary boiler such that steam is supplied to the high-pressure turbine and the intermediate-pressure turbine, a temperature of the auxiliary boiler such that the auxiliary boiler is operated at an allowed maximum temperature.

In accordance with another aspect of the present disclosure, the steam turbine may further include: a third supply pipe having a first end coupled to the main boiler, and a second end extending to the high-pressure turbine and the intermediate-pressure turbine.

In the steam turbine in accordance with another aspect of the present disclosure, the third supply pipe may be provided both with a stop valve that is disposed adjacent to the main boiler and is able to interrupt transfer of steam, and with a check valve that selectively prevents steam supplied to the high-pressure turbine and the intermediate-pressure turbine from being transferred to the main boiler.

In the steam turbine in accordance with another aspect of the present disclosure, lengths to which the first supply pipes respectively extend to the high-pressure turbine and the intermediate-pressure turbine are equal to each other.

In accordance with yet another aspect of the present disclosure, a method of preheating a steam turbine may include: a pre-warming operation of simultaneously supplying, before rotations of the turbine starts, steam to a high-pressure turbine and an intermediate-pressure turbine provided in the turbine; system-integrating and operating, after the rolling of the turbine starts, the high-pressure turbine, the intermediate-pressure turbine and a low-pressure turbine when temperatures of the high-pressure turbine and the intermediate-pressure turbine are maintained at a predetermined first setting temperature; supplying steam only to the intermediate-pressure turbine after the system integration is made; and interrupting, when it is determined that the temperature of the intermediate-pressure turbine is maintained at a second setting temperature, the supply of steam to the intermediate-pressure turbine, and supplying steam only to the high-pressure turbine.

In the method in accordance with another aspect of the present disclosure, the pre-warming operation may include supplying steam to the high-pressure turbine and the intermediate-pressure turbine at a maximum temperature depending on a capacity of the auxiliary boiler provided to supply steam to the high-pressure turbine and the intermediate-pressure turbine.

In the method in accordance with another aspect of the present disclosure, the supplying of the steam only to the intermediate-pressure turbine may include: operating, after operation of the auxiliary boiler is interrupted, the main boiler, and supplying steam only to the intermediate-pressure turbine.

In the method in accordance with another aspect of the present disclosure, the supplying of the steam only to the intermediate-pressure turbine may include: controlling temperature, pressure and flow rate of steam generated from the main boiler, to be variable depending on a power generation rate of a generator provided in the turbine.

In accordance with another aspect of the present disclosure, the method may further include, after the supplying of the steam only to the intermediate-pressure turbine, bypassing and supplying some of steam generated from the main boiler to the low-pressure turbine or other accessory devices.

It is to be understood that both the foregoing general description and the following detailed description of the present disclosure are exemplary and explanatory and are intended to provide further explanation of the invention as claimed.

Hereinafter, the configuration of a steam turbine according to an embodiment of the present disclosure will be described with reference to the attached drawings. For reference, FIG. 1 is a view schematically illustrating the configuration of the steam turbine according to the embodiment of the present disclosure.

Figure 1:
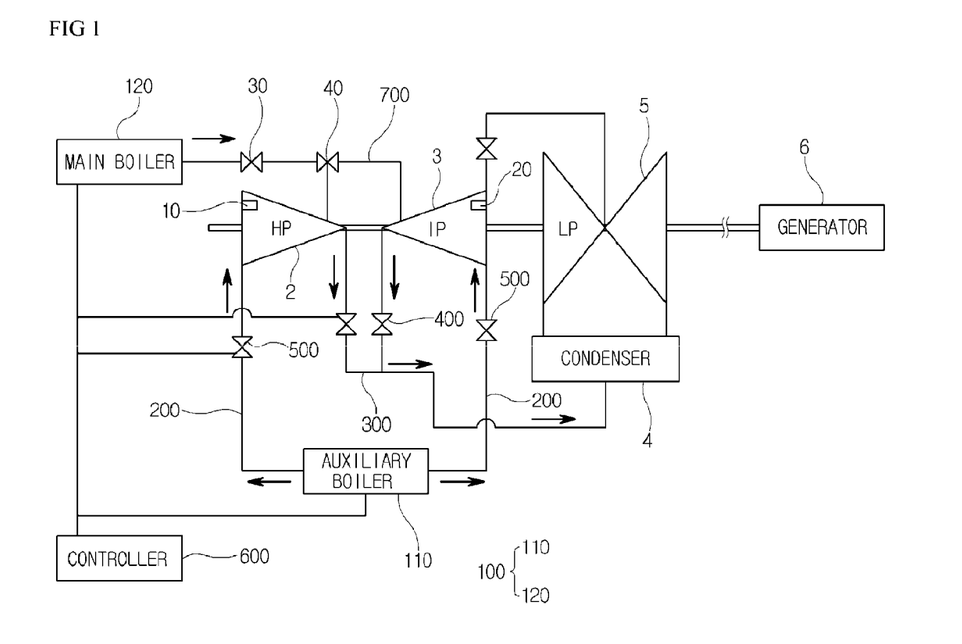
FIG. 1 is a view schematically illustrating the configuration of a steam turbine according to an embodiment of the present disclosure.
Figure 2:
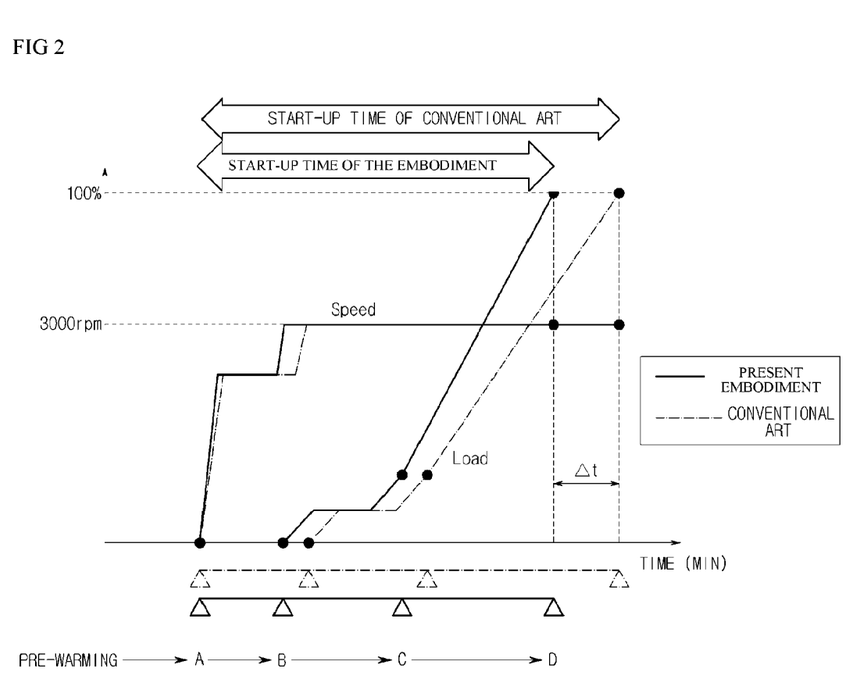
FIG. 2 is a graph comparing a start-up time of a steam turbine according to an embodiment of the present disclosure with that of a conventional technique.

Referring to FIG. 1, the steam turbine according to the present embodiment includes: a boiler unit 100 which includes an auxiliary boiler 110 and a main boiler 120 that are provided to supply steam to a high-pressure turbine 2 and an intermediate-pressure turbine 3. First supply pipes 200 diverge from the auxiliary boiler 110 and respectively extend toward the high-pressure turbine 2 and the intermediate-pressure turbine 3. A second supply pipe 300 is coupled with the high-pressure turbine 2, the intermediate-pressure turbine 3, and a condenser 4 so that steam supplied through the first supply pipe 200 can be transferred to the condenser 4 via the high-pressure turbine 2 and the intermediate-pressure turbine 3. A valve unit 500 is installed on each first supply pipe 200 and configured to be operated when the auxiliary boiler 110 is operated. A drain valve unit 400 is installed on the second supply pipe 300 and configured to discharge condensate water that has passed through the high-pressure turbine 2 and the intermediate-pressure turbine 3. A controller 600 controls opening degrees of the valve unit 500 and the drain valve unit 400 and the operation state of the boiler unit 100 depending on first setting temperatures to which temperatures of the high-pressure turbine 2 and the intermediate-pressure turbine 3 are preset.

The controller 600 controls, before rotation of the turbine starts, operation time and temperature of the auxiliary boiler 110 so that the temperatures of the high-pressure turbine 2 and the intermediate-pressure turbine 3 are respectively increased to the first setting temperatures. Furthermore, the controller 600 controls, when the temperatures of the high-pressure turbine 2 and the intermediate-pressure turbine 3 are maintained at the first setting temperatures, the operation of the main boiler 120 such that the temperature of the intermediate-pressure turbine 3 reaches a second setting temperature in a state in which the operation of the auxiliary boiler 110 is interrupted. In addition, the controller 600 controls, when the temperature of the intermediate-pressure turbine 3 is maintained at the second setting temperature, the operation of the main boiler 120 such that steam is supplied only to the high-pressure turbine 2.

In a system integration state, the high-pressure turbine 2, the intermediate-pressure turbine 3 and a low-pressure turbine 5 operate in such a way that they are axially rotated at the same time, so that a generator 6 generates power, and a load is applied to the high-pressure turbine 2, the intermediate-pressure turbine 3 and the low-pressure turbine 5.

At a step prior to the system integration of the turbine, rotor temperatures of the high-pressure turbine 2 and the intermediate-pressure turbine 3 are increased in advance to elevated (e.g., maximum) temperatures at which they can be stably operated, whereby the turbine can be operated under a warm start condition, thus reducing a start-up time, thereby enhancing power production efficiency. Therefore, the intermediate-pressure turbine 3 can be stably operated, and the power production time through the generator 6 can be reduced.

The boiler unit 100 includes the main boiler 120 and the auxiliary boiler 110. The auxiliary boiler 110 is provided to supply steam to the high-pressure turbine 2 and the intermediate-pressure turbine 3. The main boiler 120 is provided to supply high-pressure steam to the high-pressure turbine 2 after the operation of the auxiliary boiler 120 is interrupted.

The auxiliary boiler 120 is provided with the first supply pipes 200 that respectively extends, as shown in FIG. 1, from the left and right sides of the auxiliary boiler 120 toward the high-pressure turbine 2 and the intermediate-pressure turbine 3. Steam of less than 200 degrees is supplied to the high-pressure turbine 2 and the intermediate-pressure turbine 3 through the first supply pipes 200.

For reference, because the first supply pipes 200 that respectively extend to the high-pressure turbine 2 and the intermediate-pressure turbine 3 may have the same length, steam generated from the auxiliary boiler 120 can be supplied to the high-pressure turbine 2 and the intermediate-pressure turbine 3 at the same time without a time difference.

The valve unit 500 is installed on the first supply pipe 200. The valve unit 500 is a two-way type valve which is completely opened or closed, and the operation state thereof is controlled by the controller 600, which will be described in detail later herein.

For example, the valve unit 500 is controlled to be open when the auxiliary boiler 110 is operated. When the auxiliary boiler 110 is turned to an off state, the valve unit 500 may also controlled to be closed.

In the present embodiment, to increase the temperatures of the rotor of the high-pressure turbine 2 and the rotor of the intermediate-pressure turbine 3 to the first setting temperatures prior to the full rotation of the high-pressure turbine 2 and the intermediate-pressure turbine 3, under the control of the controller 600, the high-pressure turbine 2 and the intermediate-pressure turbine 3 are controlled to rotate at a speed ranging from 4 rpm to 5 rpm through a separate turning gear (not shown).

If the high-pressure turbine 2 and the intermediate-pressure turbine 3 are rotated within the above-mentioned rpm range, steam generated from the auxiliary boiler 120 is supplied to the high-pressure turbine 2 and the intermediate-pressure turbine 3 through the first supply pipes 200 so that they are heated until the temperatures thereof are increased to the first setting temperatures prior to the rotation, for example, at speeds for power generation. For reference, each above-mentioned first setting temperature is not limited to a special value because it varies depending on the capacity of the steam turbine. That is, the first setting temperatures for the high-pressure turbine 2 and the intermediate-pressure turbine 3 may vary depending on different capacities and rotor temperatures of the high-pressure turbine 2 and the intermediate-pressure turbine 3.

The controller 600 controls the auxiliary boiler 110 such that when the auxiliary boiler 110 generates steam, it is operated at the allowed increased or maximum temperature, whereby warming up the high-pressure turbine 2 and the intermediate-pressure turbine 3 can be completed in the least amount of time.

The high-pressure turbine 2 is provided with a first temperature sensor 10 for sensing the temperature, and the intermediate-pressure turbine 3 is provided with a second temperature sensor 20.

For instance, the controller 600 can control the rate of fuel supplied to the auxiliary boiler 110 such that the temperature of the auxiliary boiler 110 is rapidly increased to a preset elevated or maximum operating temperature thereof within a short time. In order to secure reliable operation of the auxiliary boiler 110, the controller 600 receives temperature data fed back from the first temperature sensor 10 and the second temperature sensor 20 and determines the temperature conditions of the auxiliary boiler 110 as time passes.

Temperature data sensed by the first and second temperature sensors 10 and 20 is transmitted to the controller 600.

The controller 600 receives the temperature data and determines the temperature conditions of the high-pressure turbine 2 and the intermediate-pressure turbine 3. In this regard, the controller 600 controls the operation of the auxiliary boiler 110 until the high-pressure turbine 2 and the intermediate-pressure turbine 3 warm up to the first setting temperatures. For reference, the auxiliary boiler 110 is operated such that steam of about 200 degrees is generated.

When it is determined that the high-pressure turbine 2 and the intermediate-pressure turbine 3 are maintained at the first setting temperature, the controller 600 controls the steam turbine such that the operation of the auxiliary boiler 110 is interrupted to stop the supply of steam to the first supply pipes 200 and then main rotation of the turbine starts.

The reason why the auxiliary boiler 110 is interrupted is because of the fact that in the case of the intermediate-pressure turbine 3, there is a limit in increasing the temperature of the intermediate-pressure turbine 3 to the second setting temperature using steam generated from the auxiliary boiler 110. Therefore, the auxiliary boiler 110 is used only until the temperature of the intermediate-pressure turbine 3 is increased to the first setting temperature.

The controller 600 performs control of the main boiler 120 such that the turbine is operated at about 3600 rpm for the rolling of the turbine. For reference, the above-mentioned rpm of the turbine is only one example to assist in understanding the description; therefore, the rpm of the turbine is not limited to the above-mentioned value.

The main boiler 120 is operated such that the intermediate-pressure turbine 3 warms up to the second setting temperature. In this regard, there are differences in temperature, pressure and flow rate between the main boiler 120 and the auxiliary boiler 110.

High-temperature and high-pressure steam generated by the operation of the main boiler 120 is supplied to the intermediate-pressure turbine 3 through a third supply pipe 700. In more detail, before the rotation of the turbine starts, the auxiliary boiler 110 is operated, and after the rotation of the turbine starts, the main boiler 120 is operated.

Before the system integration of the turbine is made after the rotation of the turbine starts, steam generated from the main boiler 120 is supplied only to the intermediate-pressure turbine 3. After the system integration of the turbine is made, the supply of steam to the intermediate-pressure turbine 3 is interrupted and steam is supplied only to the high-pressure turbine 2.

In the case where steam generated from the main boiler 120 is supplied only to the high-pressure turbine 2, a load is generated while the generator 6 is operated, and power production of the generator 6 is made.

Some of the steam generated from the main boiler 120 is bypassed and transmitted to the low-pressure turbine 5 or other components. That is, because steam that exceeds a predetermined amount can be bypassed, the reliable operation of the high-pressure turbine 2 can be secured.

The present embodiment further includes the third supply pipe 700 which has a first end coupled to the main boiler 120 and a second end extending to the high-pressure turbine 2 and the intermediate-pressure turbine 3.

The third supply pipe 700 is provided both with a stop valve 30 which can interrupt transfer of high-pressure steam generated from the main boiler 120, which will be described later herein, and with a check valve 40 which selectively prevents steam supplied to the high-pressure turbine 2 and the intermediate-pressure turbine 3 from being transferred to the main boiler 120. Therefore, steam supplied to the intermediate-pressure turbine 3 can be reliably blocked from being transferred toward the main boiler 120.

Figure 3:
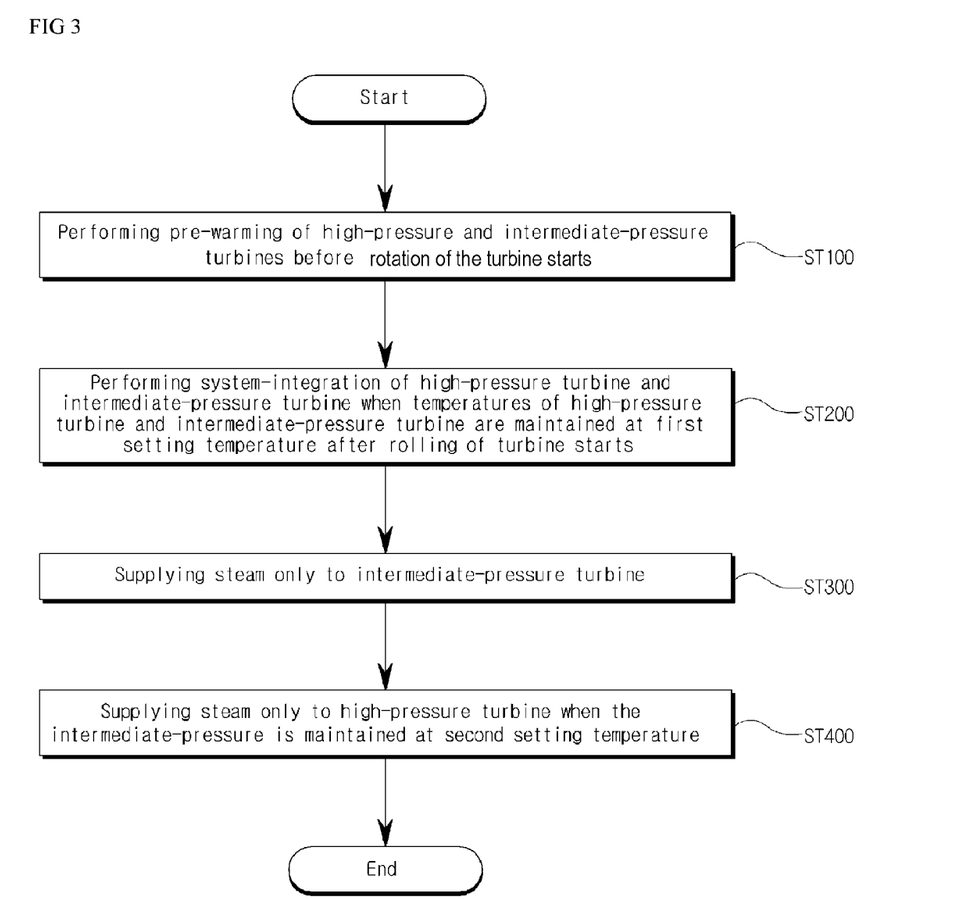
FIG. 3 is a flowchart showing a method of preheating the steam turbine according to an embodiment of the present disclosure.

A method of preheating the steam turbine according to an embodiment of the present invention will be described with reference to the attached drawings. FIG. 3 is a flowchart showing a method of preheating the steam turbine according to an embodiment of the present disclosure. FIGS. 4A, 5A, 6A and 7A are views illustrating a steam turbine according to an embodiment of the present disclosure and the operation state of the steam turbine according to the method of preheating the steam turbine.

For reference, in FIGS. 4B, 5B, 6B and 7B, the graph shown by the thick solid line illustrates the present disclosure, and the graph shown by the alternate long and short dash line illustrates the state of the turbine according to the conventional technique. In addition, the X axis indicates the time, and the Y axis indicates the rpm of the turbine.

Figure 7A:
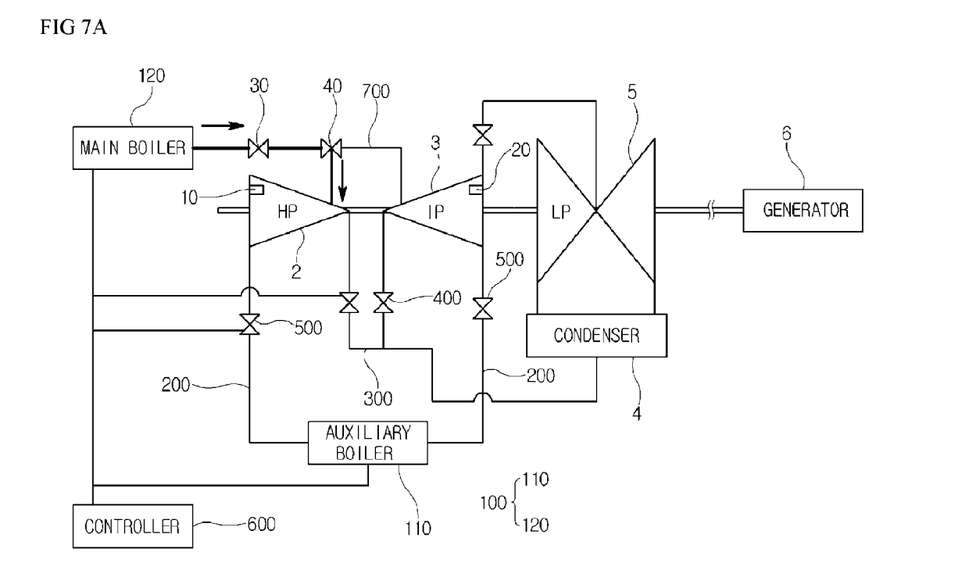
FIG. 7A is a schematic view illustrating a steam turbine according to an embodiment of the present disclosure.
Figure 7B:
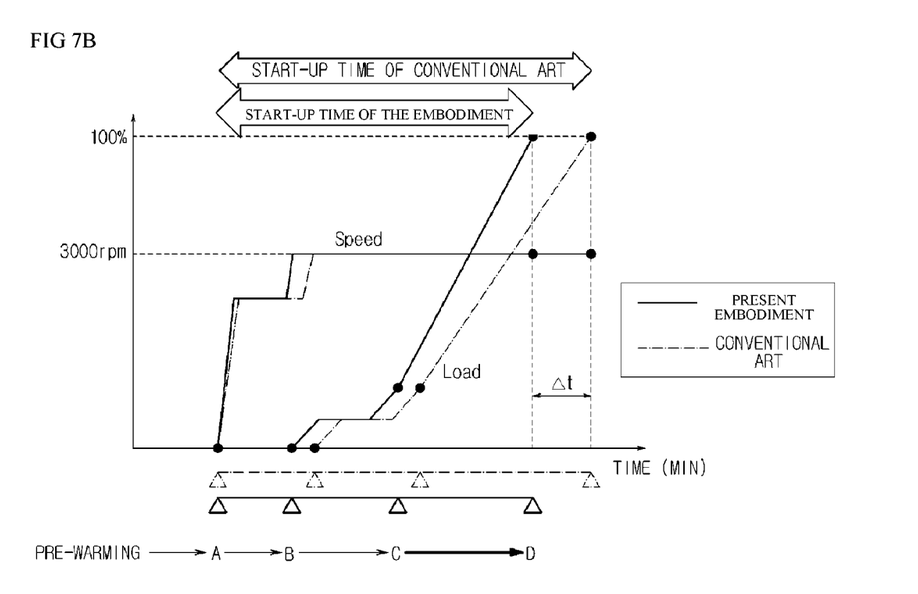
FIG. 7B is a graph of the operation state of the steam turbine according to the method of preheating the steam turbine of FIG. 7A.

Referring to FIGS. 3 to 7, the method of preheating the steam turbine according to the present embodiment includes: a pre-warming step ST100 of simultaneously supplying, before rotation of the turbine starts, steam to a high-pressure turbine and an intermediate-pressure turbine provided in the turbine (see, e.g., FIGS. 4A and 4B); step ST200 of system-integrate and operate, after the rotation of the turbine has started, the high-pressure turbine, the intermediate-pressure turbine and a low-pressure turbine in the case where the temperatures of the high-pressure turbine and the intermediate-pressure turbine are maintained at predetermined first setting temperatures; step ST300 of supplying steam only to the intermediate-pressure turbine after the system integration has been made (see, e.g., FIGS. 5A and 5B); and step ST400 of interrupting, when it is determined that the temperature of the intermediate-pressure turbine is maintained at a second setting temperature, the supply of steam to the intermediate-pressure turbine, and supplying steam only to the high-pressure turbine (see, e.g., FIGS. 7A and 7B).

Figure 4A:
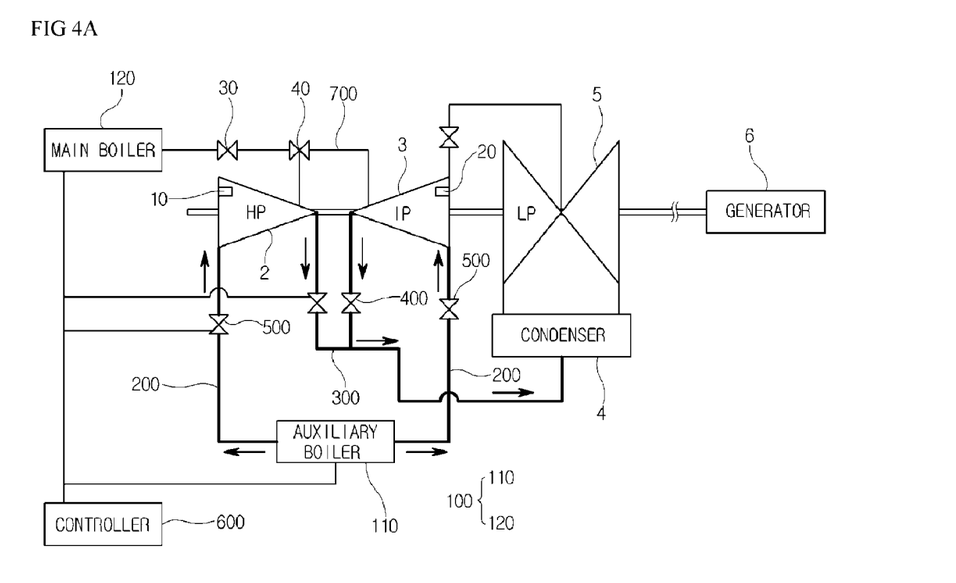
FIG. 4A is a schematic view illustrating a steam turbine according to an embodiment of the present disclosure.
Figure 4B:
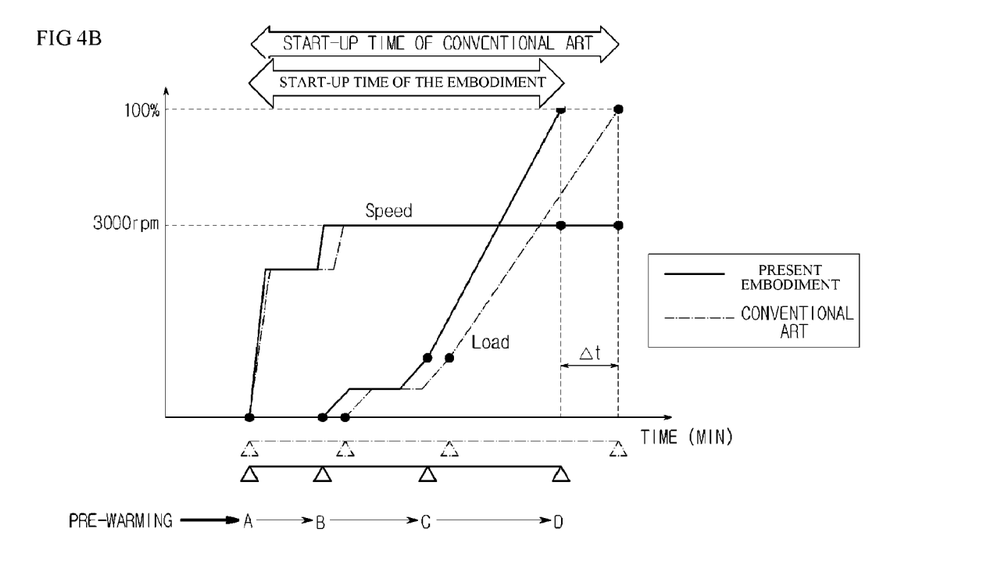
FIG. 4B is a graph of the operation state of the steam turbine according to the method of preheating the steam turbine of FIG. 4A.
Figure 5A:
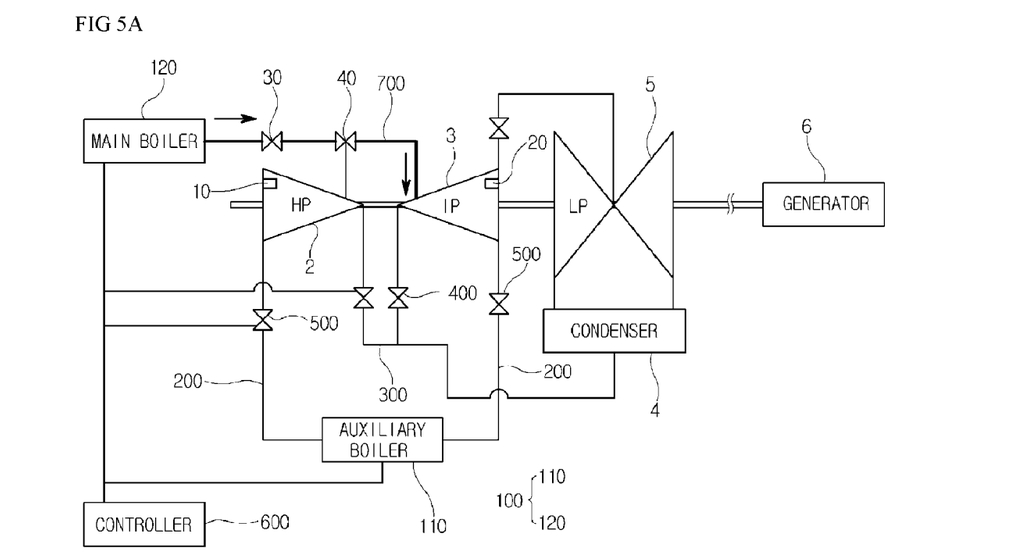
FIG. 5A is a schematic view illustrating a steam turbine according to an embodiment of the present disclosure.
Figure 5B:
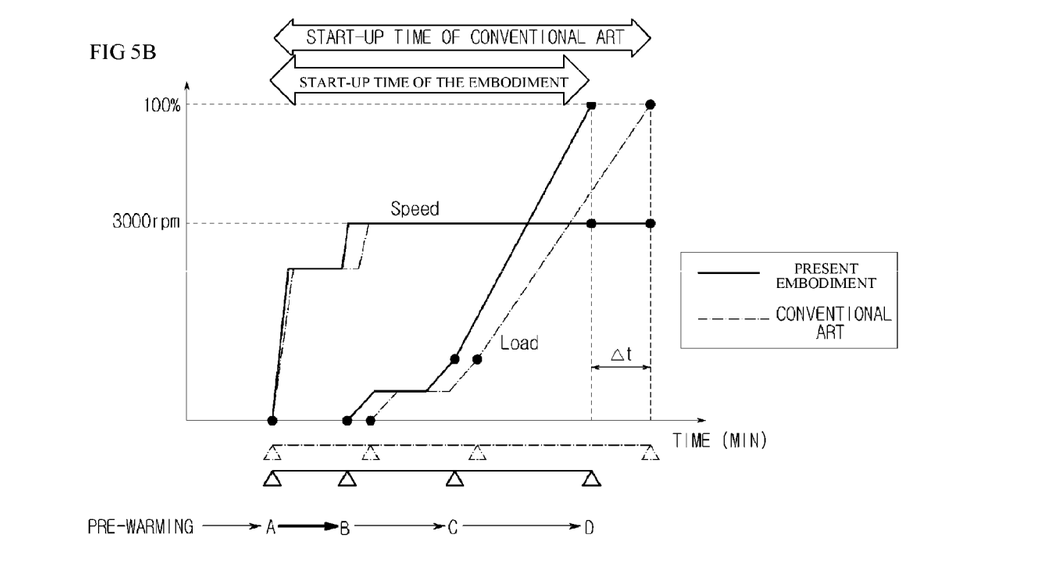
FIG. 5B is a graph of the operation state of the steam turbine according to the method of preheating the steam turbine of FIG. 5A.
Figure 6A:
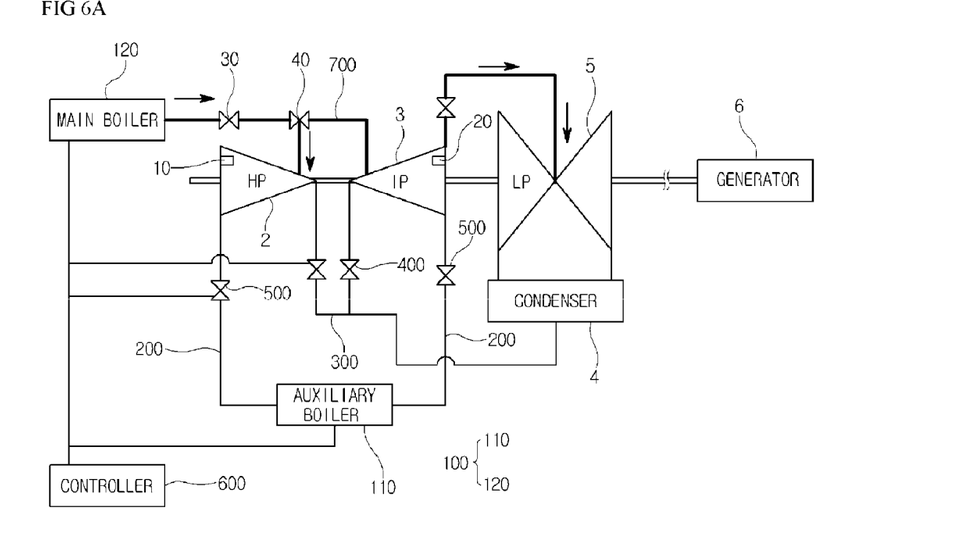
FIG. 6A is a schematic view illustrating a steam turbine according to an embodiment of the present disclosure.
Figure 6B:
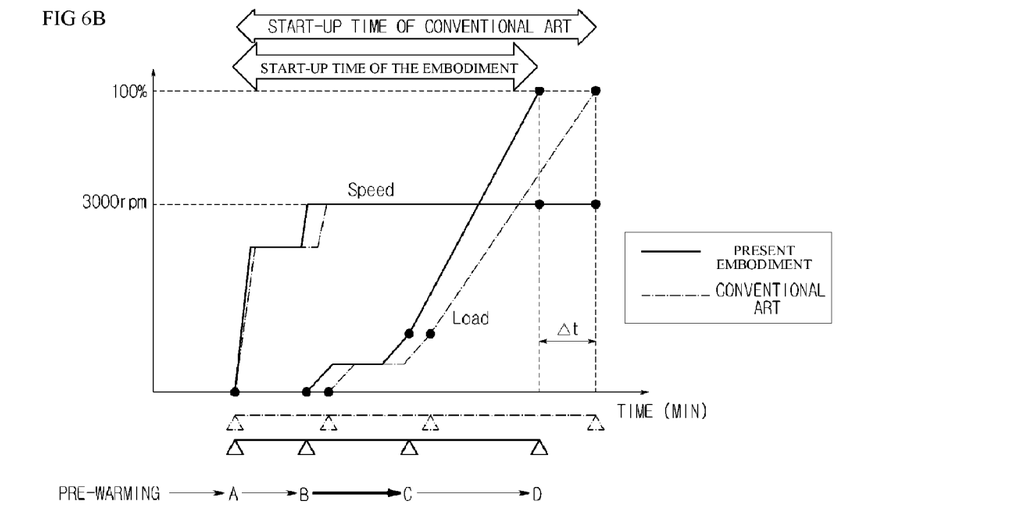
FIG. 6B is a graph of the operation state of the steam turbine according to the method of preheating the steam turbine of FIG. 6A.

At the pre-warming step ST100, before the rotation of the turbine starts, an auxiliary boiler is operated to simultaneously supply steam to the high-pressure turbine and the intermediate-pressure turbine for N minutes and warm up them. In this state, because the temperatures of rotors provided in the high-pressure turbine and the intermediate-pressure turbine are in a low temperature state, the warming up operation is performed by supplying steam of about 200 degrees thereto for N minutes until the temperatures of the rotors reach the desired first setting temperatures.

In this regard, steam is supplied to the high-pressure turbine and the intermediate-pressure turbine at the elevated or maximum temperature depending on the capacity of the auxiliary boiler provided to supply steam to the high-pressure turbine and the intermediate-pressure turbine. The rotors of the high-pressure turbine and the intermediate-pressure turbine are warmed up by the supplied steam to predetermined temperatures.

After the high-pressure turbine and the intermediate-pressure turbine have been warmed up, the rotation of the turbine starts at a point indicated by A, and the system integration of the turbine is made at a point indicated by B (at ST200). For reference, in a section from the point A to the point B, steam generated from the main boiler 120 is supplied to the intermediate-pressure turbine (at ST300).

As shown in FIG. 4B, in the case of the present embodiment, compared to the conventional technique, the time it takes to perform start-up is reduced, and power production can start earlier by the reduced time.

In the case where steam is supplied only to the intermediate-pressure turbine (at ST300), the temperature, pressure and flow rate of steam generated from the main boiler are controlled to be variable depending on a power generation rate of the generator provided in the turbine. Furthermore, some of the steam generated from the main boiler is bypassed and supplied to the low-pressure turbine or other accessory devices (see, e.g., FIGS. 6A and 6B).

With regard to the system integration of the turbine at the point B, in the present invention, the system integration can be made at an earlier time than that of the conventional technique indicated by the alternate long and short dash line.

In a section from the point B to the point C, some of the steam generated from the main boiler 120 is bypassed, and a load due to the power generation by the operation of the generator resulting from the system integration is increased over time.

In the case of the present disclosure, due to the earlier system integration compared to that of the conventional technique, as shown in the drawings, the load resulting from the operation of the generator is increased at a predetermined inclination toward the upper right-hand corner, while the load of the conventional technique is increased with a time difference from the present disclosure at a predetermined inclination toward the upper right-hand corner. Such a difference due to an increase in inclination means that the amount of generation of the generator resulting from the system integration per a given time period is relatively increased, thus causing the effect of an increase in the power production of the generator.

From the point C, while the supply of steam to the intermediate-pressure turbine is interrupted, high-pressure steam is supplied only to the high-pressure turbine (at ST400), and the turbine is operated to a full load state. In this case, as shown in the graph, the start-up time of the present embodiments can be reduced by Δt compared to that of the conventional technique.

Therefore, the start-up time it takes to re-operate the turbine that has been stopped or interrupted, e.g., for inspection, can be reduced. Thereby, due to an increase in the power generation rate, the economic feasibility can be enhanced, and there is the effect of a cost reduction by the reduced time. In the case where a plurality of turbines are operated, it is to be noted that economic effect by the present disclosure is considerable in proportion to driving lifetime.

Embodiments of the present disclosure can prevent or mitigate a rotor of an intermediate-pressure turbine from being deformed or damaged by thermal stress due to repeated start-up and restart-up of a steam turbine, thus promoting the reliable operation of the steam turbine even after it is used over a long period of time.

Embodiments of the present disclosure facilitate pre-warming of the steam turbine and reduce a start-up time compared to the conventional technique, thus increasing a power production rate of a generator.

While the present disclosure has been described with respect to the specific embodiments, it will be apparent to those skilled in the art that various changes and modifications may be made without departing from the spirit and scope of the disclosure as defined in the following claims.

It will be apparent to those skilled in the art that various changes and modifications may be made without departing from the spirit and scope of the embodiments as defined in the following claims.

The embodiments discussed have been presented by way of example only and not limitation. Thus, the breadth and scope of the invention(s) should not be limited by any of the above-described exemplary embodiments, but should be defined only in accordance with the following claims and their equivalents. Moreover, the above advantages and features are provided in described embodiments, but shall not limit the application of the claims to processes and structures accomplishing any or all of the above advantages.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, the claims should not be limited by the language chosen under a heading to describe the so-called technical field. Further, a description of a technology in the "Background" is not to be construed as an admission that technology is prior art to any invention(s) in this disclosure. Neither is the "Brief Summary" to be considered as a characterization of the invention(s) set forth in the claims found herein. Furthermore, any reference in this disclosure to "invention" in the singular should not be used to argue that there is only a single point of novelty claimed in this disclosure. Multiple inventions may be set forth according to the limitations of the multiple claims associated with this disclosure, and the claims accordingly define the invention(s), and their equivalents, that are protected thereby. In all instances, the scope of the claims shall be considered on their own merits in light of the specification, but should not be constrained by the headings set forth herein.

What is claimed is:

1. A steam turbine, comprising:
a boiler unit including an auxiliary boiler and a main boiler that supply steam to a high-pressure turbine and an intermediate-pressure turbine;
first supply pipes diverging from the auxiliary boiler and respectively extending to the high-pressure turbine and the intermediate-pressure turbine;
a second supply pipe coupled with the high-pressure turbine, the intermediate-pressure turbine, and a condenser so that steam supplied through the first supply pipes is transferred to the condenser via the high-pressure turbine and the intermediate-pressure turbine;
a plurality of valve units respectively disposed on each of the first supply pipes and configured to be operated when the auxiliary boiler is operated;
a drain valve unit disposed on the second supply pipe and configured to discharge condensate water that has passed through the high-pressure turbine and the intermediate-pressure turbine; and
a controller configured to control an opening amount of each of the valve units and the drain valve unit and to control an operation state of the boiler unit based on a first setting temperature to which temperatures of the high-pressure turbine and the intermediate-pressure turbine are preset, wherein
the controller is configured to control, before rotation of the intermediate-pressure turbine starts, an operation time and temperature of the auxiliary boiler so that the temperatures of the high-pressure turbine and the intermediate-pressure turbine are increased to the first setting temperature, and
the controller is configured to control, after determining that the temperatures of the high-pressure turbine and the intermediate-pressure turbine are maintained at the first setting temperature, operation of the main boiler such that the temperature of the intermediate-pressure turbine reaches a second setting temperature while operation of the auxiliary boiler is interrupted, and
the controller is configured to control, after determining that the temperature of the intermediate-pressure turbine is maintained at the second setting temperature, the operation of the main boiler such that steam is supplied to the high-pressure turbine.

2. The steam turbine according to claim 1, wherein the controller is configured to control, when controlling the auxiliary boiler such that steam is supplied to the high-pressure turbine and the intermediate-pressure turbine, a temperature of the auxiliary boiler such that the auxiliary boiler is operated at an allowed maximum temperature.

3. The steam turbine according to claim 1, wherein lengths to which the first supply pipes respectively extend to the high-pressure turbine and the intermediate-pressure turbine are equal to each other.

4. The steam turbine according to claim 1, further comprising:
a first temperature sensor configured to sense the temperature of the high-pressure turbine; and
a second temperature sensor configured to sense the temperature of the intermediate-pressure turbine.

5. The steam turbine according to claim 4, wherein the controller is configured to receive temperature data sensed by the first temperature sensor and the second temperature sensor and determines the temperatures of the high-pressure turbine and the intermediate-pressure turbine.

6. The steam turbine according to claim 1, further comprising a third supply pipe having a first end coupled to the main boiler and a second end extending to the high-pressure turbine and the intermediate-pressure turbine.

7. The steam turbine according to claim 6, wherein the third supply pipe includes
a stop valve that is disposed adjacent to the main boiler and is operable to interrupt transfer of steam, and
a check valve that selectively prevents steam supplied to the high-pressure turbine and the intermediate-pressure turbine from being transferred to the main boiler.

8. A method of preheating a steam turbine, comprising:
supplying, simultaneously and before rotation of the turbine starts, steam to a high-pressure turbine and an intermediate-pressure turbine provided in the turbine;
operating, after the rotation of the turbine starts, the high-pressure turbine, the intermediate-pressure turbine and a low-pressure turbine to maintain temperatures of the high-pressure turbine and the intermediate-pressure turbine at a predetermined first setting temperature;
supplying steam to the intermediate-pressure turbine after the temperature of the intermediate-pressure turbine reaches the first setting temperature; and
interrupting, after determining that the temperature of the intermediate-pressure turbine is maintained at a second setting temperature, the supply of steam to the intermediate-pressure turbine, and supplying steam to the high-pressure turbine.

9. The method according to claim 8, wherein the supplying before rotation includes supplying steam to the high-pressure turbine and the intermediate-pressure turbine at a maximum temperature depending on a capacity of the auxiliary boiler provided to supply steam to the high-pressure turbine and the intermediate-pressure turbine.

10. The method according to claim 8, wherein the supplying of the steam only to the intermediate-pressure turbine includes operating, after operation of the auxiliary boiler is interrupted, the main boiler, and supplying steam only to the intermediate-pressure turbine.

11. The method according to claim 8, wherein the supplying of the steam only to the intermediate-pressure turbine includes controlling temperature, pressure and flow rate of steam generated from the main boiler, to be variable depending on a power generation rate of a generator provided in the turbine.

12. The method according to claim 8, further comprising, after the supplying of the steam only to the intermediate-pressure turbine, bypassing and supplying some of steam generated from the main boiler to the low-pressure turbine or other accessory devices.

* * * * *